US007386151B1

(12) United States Patent
Moritz

(10) Patent No.: US 7,386,151 B1
(45) Date of Patent: Jun. 10, 2008

(54) SYSTEM AND METHOD FOR ASSESSING SUSPICIOUS BEHAVIORS

(75) Inventor: Elan Moritz, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 841 days.

(21) Appl. No.: 10/964,966

(22) Filed: Oct. 15, 2004

(51) Int. Cl.
*G06K 9/00* (2006.01)

(52) U.S. Cl. .................. 382/116; 382/278; 713/186; 707/104.1; 707/3; 704/246; 704/274; 340/5.52; 340/506

(58) Field of Classification Search ............... 382/100, 382/116, 115, 118, 224, 278, 276, 305; 235/379, 235/380, 382, 375, 383, 384; 705/1, 75; 713/186, 201; 707/1, 3, 104.1; 709/223, 709/224; 704/246, 200, 231, 251, 273, E17.001, 704/E17.003, 274; 702/179, 180, 187; 340/500, 340/540, 573.1, 5.83, 5.52, 5.53, 5.82, 506
See application file for complete search history.

(56) References Cited

U.S. PATENT DOCUMENTS 5,991,429 A * 11/1999 Coffin et al. ............... 382/118

| 6,698,653 | B1 * | 3/2004 | Diamond et al. | 235/375 |
| 7,246,740 | B2 * | 7/2007 | Swift et al. | 235/379 |
| 7,272,565 | B2 * | 9/2007 | Mardirossian | 704/273 |
| 7,299,152 | B1 * | 11/2007 | Moritz | 702/179 |
| 2004/0088584 | A1 * | 5/2004 | Shachar et al. | 713/201 |
| 2004/0116842 | A1 * | 6/2004 | Mardirossian | 604/1 |
| 2004/0131160 | A1 * | 7/2004 | Mardirossian | 379/38 |
| 2005/0171787 | A1 * | 8/2005 | Zagami | 705/1 |

* cited by examiner

*Primary Examiner*—Sheela C Chawan
(74) *Attorney, Agent, or Firm*—James T. Shepherd

(57) ABSTRACT

Identity and biometric data are collected from individuals. The collected data is used to form biometric data packages, each of which contains information about one biometric feature and identity data associated with the corresponding individual. Each biometric data package is stored in a categorical fashion based on its biometric feature. A current query from a requesting source includes at least one monitored biometric feature of an individual of interest. A first correlation is performed between the current query's monitored biometric feature and the same type of biometric feature associated with those of the biometric data packages previously stored in a categorical fashion. A second correlation is performed between the current query's monitored biometric feature and the monitored biometric feature associated with each of the previous queries. Results of the correlations can be indications of suspicious behavior that was used by the requesting source to form the current query.

24 Claims, 3 Drawing Sheets

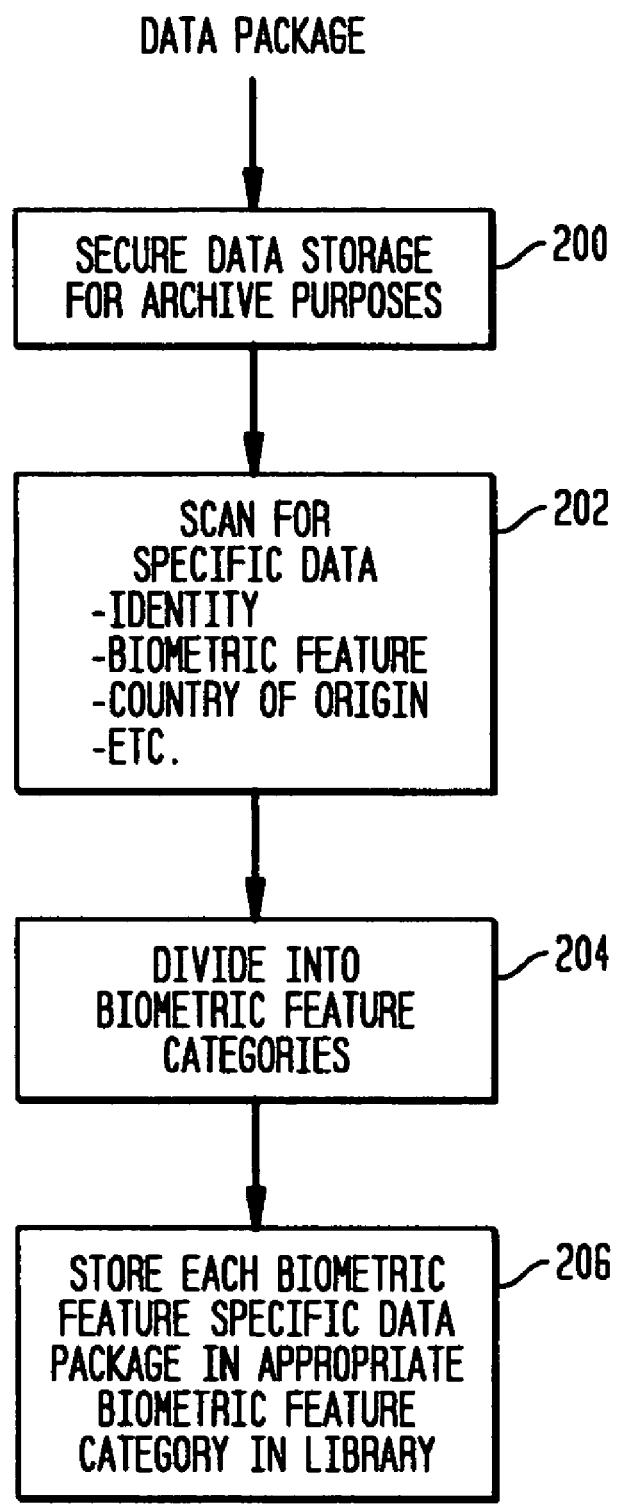

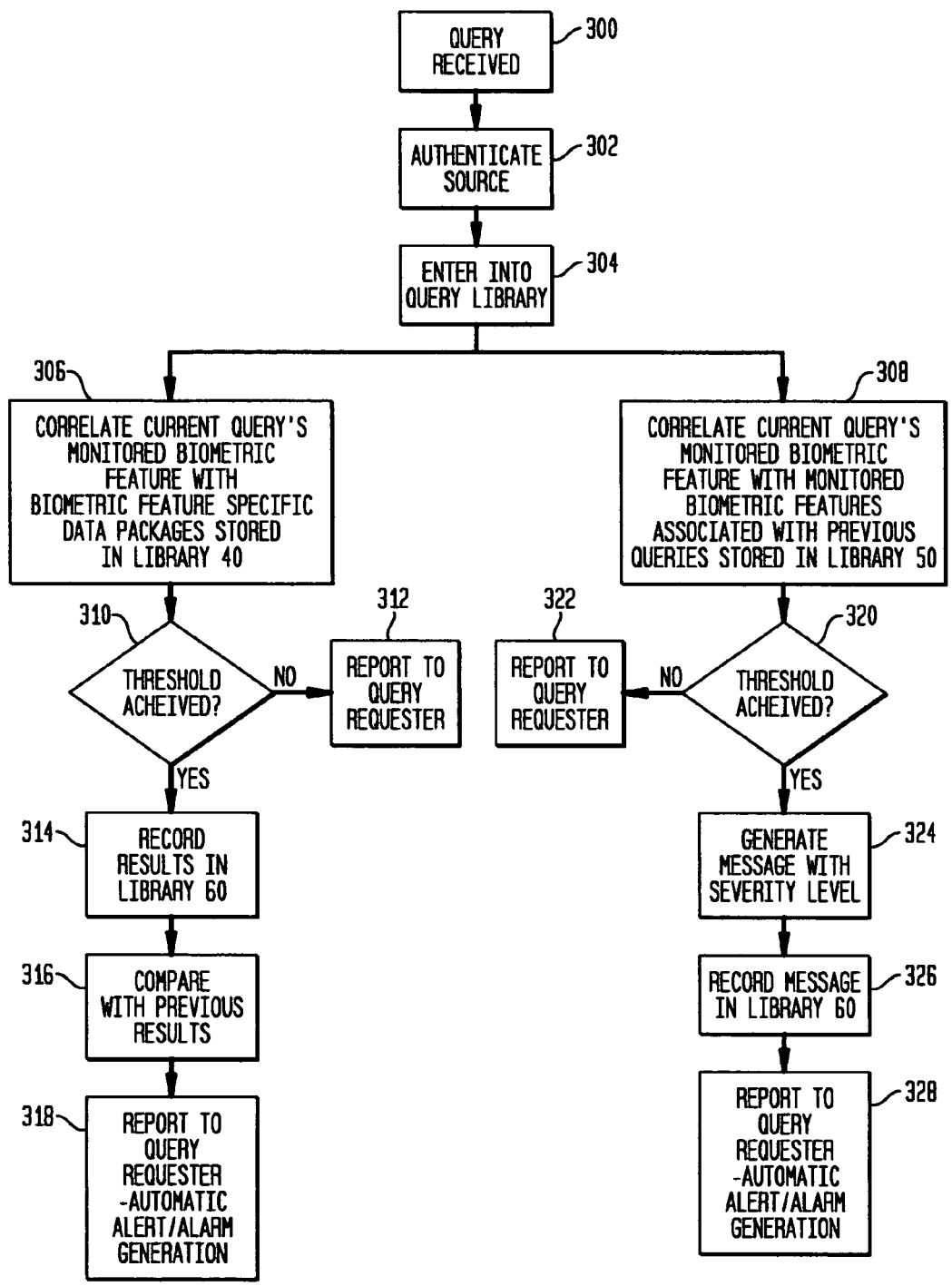

SYSTEM AND METHOD FOR ASSESSING SUSPICIOUS BEHAVIORS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to recognizing suspicious behavior, and more particularly to a system and method for assessing suspicious behavior that may be a precursor to terrorist activity.

BACKGROUND OF THE INVENTION

The prevention of terrorist acts is a daunting task. As the world has already witnessed, the actions of just a few individuals can cause horrendous results. Post-event analysis has shown that there is very frequently suspicious behavior leading up to terrorist activity. Such behavior includes increased amounts of "chatter" on various monitored forms of communication (e.g., phone lines, cellular phone networks, internet, etc.), the presence of suspicious individuals around a sensitive site, an increase in the number of individuals arriving from specific foreign countries, the movement or location of known suspicious individuals in an area of concern, etc. Currently, security agencies rely on various forms of marginally-effective analysis techniques to assess the relevance of a variety of suspicious behaviors in an effort to thwart possible terrorist activities. However, the techniques are largely human-implemented and, therefore, are subject to an individual's interpretive and analysis skills.

SUMMARY OF THE INVENTION

Accordingly, it is an object of the present invention to provide a system and method for assessing suspicious behavior that may be related to terrorist activity.

Another object of the present invention is to provide a system and method for automatically assessing suspicious behavior that may be related to terrorist activity and then advising appropriate parties of the results of the assessment.

Other objects and advantages of the present invention will become more obvious hereinafter in the specification and drawings.

In accordance with the present invention, a system and method are provided for assessing suspicious behavior. Data packages are received from a plurality of data sources with each data package containing information about an individual to include identity data and biometric features unique to the individual. The data packages are stored and processed. In terms of processing, a plurality of biometric data packages are formed from each data package with each of the biometric data packages containing information about one of the biometric features and identity data associated with the individual. Each of the biometric data packages is stored in a categorical fashion based on the one biometric feature associated therewith. The system is further adapted to receive a current query from a requesting source. The current query includes at least one monitored biometric feature of an individual of interest. The current query is stored to thereby generate a plurality of queries with each of the stored queries having at least one monitored biometric feature associated therewith. A first correlation is performed between the monitored biometric feature associated with the current query and the same type of biometric feature associated with those of the biometric data packages previously stored in a categorical fashion. When the first correlation achieves a first threshold criteria, the individual of interest is considered to be identified by the identity data contained in each of the biometric data packages used in the first correlation. A second correlation is performed between the monitored biometric feature associated with the current query and the monitored biometric feature associated with each of the (previous) queries that have already been stored. An alert message is generated each time the second correlation achieves a second threshold criteria. Results of the first and second correlation are transmitted to at least the requesting source. In particular, the results of the first correlation include the individual of interest so-identified, while the results of the second correlation include the alert message so-generated.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 2 is a top-level flow diagram of the steps associated with the processing of incoming data prior to use thereof in the assessment of suspicious behavior in accordance with the present invention; and FIG. 3 is a top-level flow diagram of the steps associated with query processing in accordance with the present invention.

DETAILED DESCRIPTION OF THE INVENTION

Figure 1:
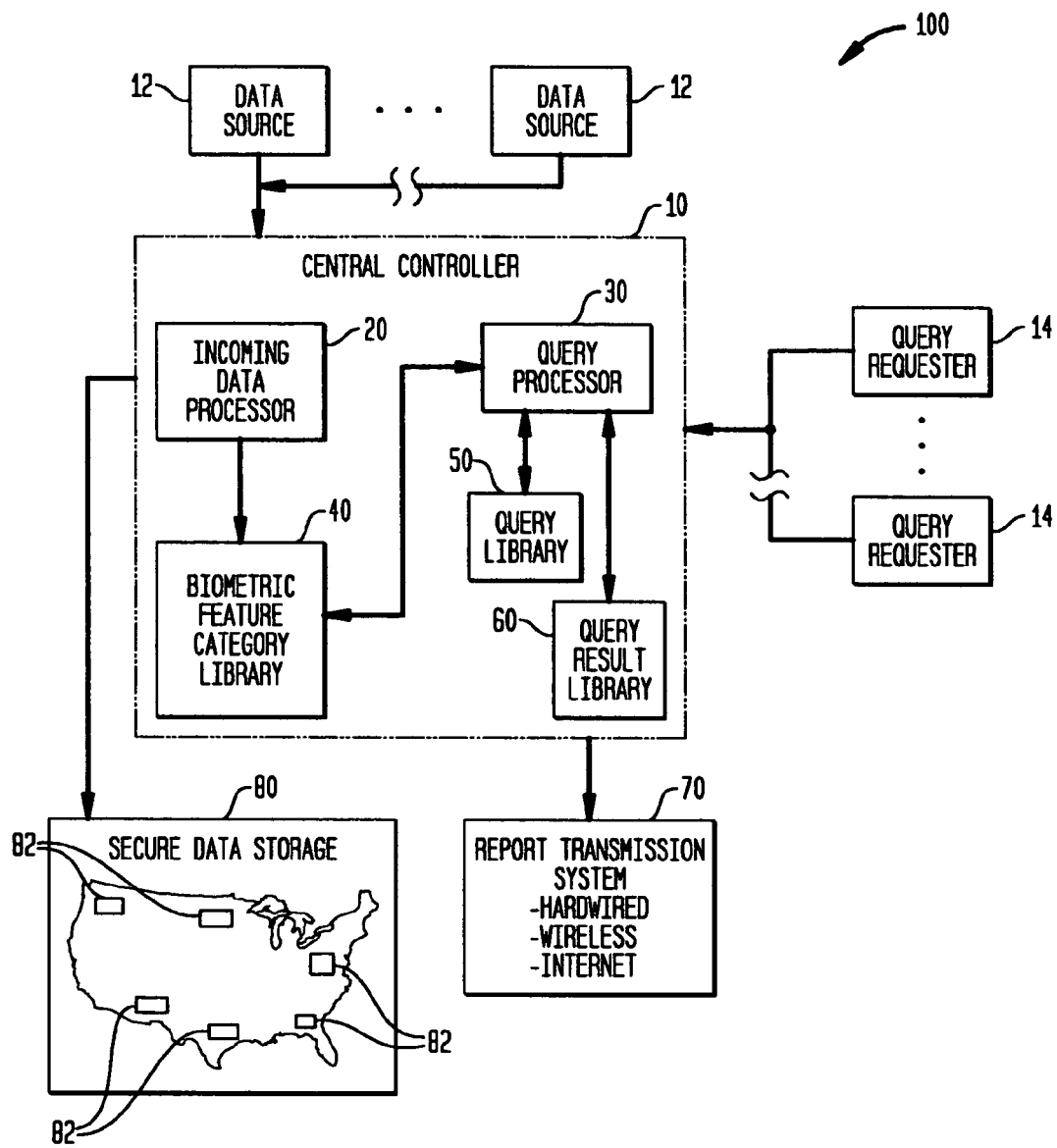
FIG. 1 is a top-level diagram of a system for assessing suspicious behavior in accordance with the present invention.

Referring now to the drawings, and more particularly to FIG. 1, a system for use in assessing suspicious behavior in accordance with the present invention is shown and is referenced generally by numeral 100. By way of example, system 100 will be described for assessing behavior that may be indicative of terrorist activity. However, it is to be understood that the present invention could also be used to assess behavior indicative of other types of activities.

At the heart of system 100 is a central controller 10 that is realized by one or more processors and one or more data storage libraries. It is to be understood that the number/naming of processors and libraries used in this description have been selected to facilitate an understanding of the present invention and do not represent structural limitations thereof. Accordingly, one skilled in the art could construct central controller 10 in a manner that will differ from the present description without departing from the scope of the present invention and its claims.

Central controller 10 receives and processes data in the form of what will be referred to herein as "data packages". Each such data package originates from one of a plurality of data sources 12 that will typically be distributed about a country at the country's various entry points (e.g., airports, seaports, border crossings, etc.). In general, a single data package contains information about an individual that has entered the country through one of the entry points. More specifically, a data package contains both identity information about the individual and biometric feature data unique to the individual. Both the identity information and biometric features are taken or collected at the time that the individual passes through or is stopped at a particular entry point. Each data source 12 can be realized by a plurality of stations (not shown), each of which collects identity and biometric data. Each data source 12 also includes a local controller (not shown) that transmits the data packages. For example, each data source 12 could be constructed as described in a co-pending patent application entitled "BIOMETRIC DATA COLLECTION AND STORAGE SYSTEM" (Navy Case No. 96171 filed August, 2004), the contents of which are hereby incorporated by reference.

The identity information included in each data package can include standard identity data gathered from the individual's passport, license, etc., and can further include data requested from the individual such as length of stay, local address while visiting the country, purpose of visit, etc. The biometric feature data is taken/recorded/collected at the entry point and can include, but is not limited to, images of the individual, voice recordings of the individual, weight of the individual, finger and/or palm print data of the individual, retinal scan data for the individual, and/or DNA data for the individual.

Central controller 10 also receives and processes queries originating from a plurality of query requesters 14. Each such query includes some monitored biometric feature associated with a known or unknown individual who has been identified either manually or automatically as being involved with some form of suspicious behavior. As used herein, the term "suspicious behavior" refers to any type of behavior that is considered to represent a precursor to possible terrorist activity. Such suspicious behaviors could include, but are not limited to, the single or repeated presence of an individual at a sensitive site, the detection of certain words or phrases of a suspect nature on one or more various forms of communication "lines" (e.g., telephone lines, cellular networks, wireless frequencies, internet communications, etc.), single or repeated meetings of collections of individuals, etc. The monitored biometric feature of the individual(s) can include images (e.g., photographic, infrared, etc.) voice prints, finger or palm prints, retinal scans and/or DNA data collected during the occurrence of the suspicious behavior. Thus, each query from a query requester 14 can be generated by security personnel monitoring a site or by automated systems monitoring a site, communication channels, etc. It is assumed herein that monitored situations involving more than one individual (e.g., more than one individual at a site, more than one voice on a communication channel, etc.) will generate multiple queries with each query having biometric features associated with just one of the individuals.

Central controller 10 includes an incoming data processor 20, a query processor 30, and a number of data storage libraries to include a biometric feature category library 40 coupled to each of processors 20 and 30, a query library 50 coupled to processor 30 and a query result library 60 coupled to processor 30. As will be explained further below, the results generated by query processor 30 are provided to a report transmission system 70 that is capable of transmitting data via one or more of hardwire connections, wireless communications, and internet communications.

System 100 also includes secure data storage 80 for storing each data package in an "as is" state. This is important for archiving purposes and, possibly, evidentiary purposes as the processing of each data package can result in loss of some data. Thus, the integrity of the originally-collected data is maintained by storing each "raw" data package in secure data storage 80. By way of example, secure data storage 80 could be realized by a data storage system that uses storage devices/facilities 82 geographically-distributed over a large region (e.g., the United States) as described in U.S. patent application Ser. No. 10/847,682, filed May 17, 2004, the contents of which are hereby incorporated by reference. Briefly, secure data storage 80 has data storage devices/facilities 82 dispersed over a geographic area such that any two of the data storage devices/facilities are separated by a distance measured in miles or kilometers. Each data package is divided up or parsed into constituent components thereof. If desired, each parsed portion of a data package can be encrypted and encoded with the means to allow reconstruction of the original data package at a later time. The constituent components are then distributed approximately evenly amongst data storage devices/facilities 82 for storage thereat.

Referring additionally, now to FIG. 2, the processing of incoming data packages (by processor 20) will now be explained. As just described, each data package is stored at step 200 in secure data storage 80. Processor 20 can optionally be tasked (as evidenced by step 202) to initially scan each incoming data package for correlation with already known identity and/or biometric data associated with person(s) of interest. This step can thus serve to initiate tracking of certain person(s) upon their arrival in a country. Each incoming data package serves as the basis for forming a number of biometric feature specific data packages at step 204. More specifically, each biometric feature specific data package is formed with one biometric feature from the "parent" data package and all of the identity data contained in the "present" data package. For example, if a data package contained image, voice recording and fingerprint types of biometric data, three biometric feature specific data packages would be formed with each having (i) one of the specific biometric data, and (ii) all identity data from the "parent" data package. At step 206, each of the biometric feature specific data packages is stored in library 40 in a sorted or categorized fashion based on the package's particular biometric feature.

Referring additionally now to FIG. 3, query processing in accordance with the present invention will now be described. At step 300, a query is received at processor 30 from one of any number of query requesters 14 (FIG. 1). At a minimum, the query will include the source of the query request and at least one biometric feature that has been collected/taken by some "monitor" that can be a person, an automatic sensing device/system, or any other type of monitoring scheme. Each query request is authenticated at step 302 in terms of its requesting source. An authenticated query is then entered in query library 50 at step 304 to form a database of all such queries.

Query processor 30 next performs two types of correlations at steps 306 and 308 to determine if the current query is indicative of possible suspicious behavior. The first correlation performed at step 306 uses the data in biometric feature category library 40. More specifically, step 306 correlates the monitored biometric feature contained in the current query with the appropriate category of stored biometric feature specific data packages stored in library 40. For example, if the current query's monitored biometric feature is a voice print (generated by either manual or automated monitors), step 306 performs its correlation using the current query and the voice print-based biometric feature specific data packages stored in library 40. If a current query contains more than one biometric feature (e.g., an image and fingerprint data), the correlation at step 306 is performed for each such feature.

Each correlation performed at step 306 is evaluated at step 310 in terms of satisfying a threshold criteria. Since the present invention's goal is to provide a tool/method for preventing disaster, the threshold criteria for each type of biometric feature will typically be set at a level that is triggered by a "less than 100% correlation" (i.e., not an exact match). That is, the present invention errs on the side of identifying a particular individual associated with suspicious behavior. The particular threshold criteria levels can be different depending on the particular biometric feature.

A report can be generated at step 312 when the threshold criteria of correlation step 310 is not satisfied. This report can be transmitted by any appropriate transmission system to the current query's query requester 14 as well as any other appropriate agencies. The number and choices of such agencies is not a limitation of the present invention. More importantly, when the threshold criteria is satisfied at step 310, the results of the correlation can be recorded or stored at step 314 in query result library 60. The recorded results will include the particular biometric feature that achieved correlation and the identity data associated with same that is stored in library 40. Additionally or optionally, the most recently stored result from step 314 can be used at step 316 to see if the identity data (i.e., the data identifying a particular individual) associated with the most recently stored result has previously been recorded in query result library 60. Step 316 can be included if multiple occurrences of the particular identity data are considered to be a further indicator of possible suspicious behavior. The results recorded at step 314 (and developed from step 316) are reported (by any appropriate transmission system) at step 318 to the current query's query requester 14 and any other appropriate agency, the choices of which are not limitations of the present invention. Reporting step 318 can include the generation of automated alerts/alarms at, for example, the originating query requester 14, the site at which the individual was monitored, central controller 10, any number of appropriate security and law enforcement agencies, etc.

The second correlation performed by query processor 30 at step 308 involves use of the current query and the data stored in query library 50. More specifically, step 308 correlates the monitored biometric feature(s) contained in the current query with the monitored biometric features associated with each of the previous queries that have been logged into query library 50. The goal of correlation step 308 is to search for previous queries based on a high degree of correlation between a monitored biometric feature to thereby establish a pattern of suspicious behavior ultimately attributable to a specific individual. As with the previously-described correlation process, each correlation performed at step 308 is evaluated at step 320 in terms of satisfying a threshold criteria. The threshold criteria for each type of biometric feature can be set at a suitable level. Typically, the threshold criteria will be set at levels that are satisfied by correlations that are less than 100% so that close matches with previous queries are identified.

A report can be generated at step 322 when the threshold criteria of step 320 is not satisfied. This report can be transmitted to the query requester 14 that generated the current query, as well as any other appropriate agencies.

When the threshold criteria is satisfied at step 320, a message (e.g., "possible match found"), is generated at step 324 indicating that a possible match with a previous query has been found. The number of "matches" found at step 320 for a current query are used at step 324 to assign a severity level to the generated message. For example, if the current query's biometric feature generates just one "match" with the previous queries stored in library 50, the severity level would be lower than if several or numerous matches were found. The current query's biometric feature and its associated message and severity level can be recorded in query result library 60 at step 326 for access by any authorized agency. The message and severity level thereof are also reported (by any appropriate transmission system) to the current query's requester 14 (as well as any other appropriate agency) at step 328. Similar to reporting step 318, reporting step 328 can include the generation of automated alerts/alarms at, for example, the originating query requester 14, the site at which the individual was monitored, central controller 10, any number of appropriate security and law enforcement agencies, etc.

The advantages of the present invention are numerous. The biometric feature associated with the current query is used to identify a particular individual at step 318. This identity combined with the message/report (from either step 322 or step 328) provides the current query's query requester 14 (as well as any other agency receiving same) the possible relevance or concern attributable to the person so-identified. Thus, the present invention provides a tool and method that can be used to automatically alert various authorities to an individual's identity when suspicious behavior is detected. The identity will typically include name, address and a nationality of the individual. The information can be easily disseminated to the appropriate authorities. For example, if suspicious behavior were detected at a sensitive site, a generated alert would be automatically sent to the original query requester, the appropriate authorities that control/operate the sensitive site, the appropriate national/international authorities, and authorities in charge of policing the locale surrounding the site. By being alerted to the identity of persons involved with suspicious behavior, security and law enforcement agencies can work to disrupt possible terrorist activity during the planning stages thereof.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for assessing suspicious behavior, comprising:

processing means adapted to receive data packages from a plurality of data sources, each of said data packages containing information about an individual to include identity data and biometric features unique to said individual;

storage means coupled to said processing means for storing said data packages;

said processing means forming a plurality of biometric data packages from each of said data packages with each of said plurality of biometric data packages containing information about one of said biometric features and said identity data associated with said individual;

first library means coupled to said processing means for categorically storing each of said plurality of biometric data packages based on said one of said biometric features associated therewith;

said processing means further adapted to receive a current query from a requesting source, said current query including at least one monitored biometric feature of an individual of interest;

second library means coupled to said processing means for storing each said current query to thereby generate a plurality of queries, each of said plurality of queries having said at least one monitored biometric feature associated therewith;

said processing means utilizing said first library means to perform a first correlation between said monitored biometric feature associated with said current query and said one of said biometric features associated with each of said plurality of biometric data packages, wherein said individual of interest is considered to be identified by said identity data contained in each of said plurality of biometric data packages for which said first correlation achieves a first threshold criteria;

said processing means utilizing said second library means to perform a second correlation between said monitored biometric feature associated with said current query and said monitored biometric feature associated with each of said plurality of queries, wherein an alert message is generated each time said second correlation achieves a second threshold criteria; and transmitting means coupled to said processing means for transmitting, to at least said requesting source, results of said first correlation to include said individual of interest so-identified and results of said second correlation to include each said alert message so-generated.

2. A system as in claim 1 further comprising third library means coupled to said processing means for storing said results of said first correlation and said results of said second correlation.

3. A system as in claim 2 wherein said processing means periodically searches said results of said first correlation stored in said third library means to check for multiple identifications of said individual of interest.

4. A system as in claim 1 wherein said data packages are generated at an entry point to a country, and wherein said identity data comprises at least a name of said individual, nationality of said individual, and a local address where said individual is to reside while in said country.

5. A system as in claim 1 wherein said data packages are generated at an entry point to a country, and wherein said biometric features contained in said data packages comprise at least one of
   (i) images of said individual taken at said entry point,
   (ii) voice recordings of said individual recorded at said entry point,
   (iii) weight of said individual recorded at said entry point,
   (iv) fingerprint data for said individual taken at said entry point,
   (v) palm print data for said individual taken at said entry point,
   (vi) retinal scan data for said individual taken at said entry point, and
   (vii) DNA data for said individual taken at said entry point.

6. A system as in claim 1 wherein said storage means comprises individually-accessible storage facilities geographically-distributed over an area such that spacing between any two of said storage facilities is on the order of miles.

7. A system as in claim 6 wherein said processing means parses each of said data packages into constituent components thereof and distributes said constituent components amongst at least a portion of said data storage facilities.

8. A system as in claim 1 wherein said transmitting means automatically transmits each said alert message so-generated.

9. A method of assessing suspicious behavior, comprising the steps of:
   providing data packages from a plurality of data sources, each of said data packages containing information about an individual to include identity data and biometric features unique to said individual;
   forming a plurality of biometric data packages from each of said data packages with each of said plurality of biometric data packages containing information about one of said biometric features and said identity data associated with said individual;
   categorically storing each of said plurality of biometric data packages based on said one of said biometric features associated therewith;
   accepting a current query from a requesting source, said current query including at least one monitored biometric feature of an individual of interest;
   storing each said current query to thereby generate a plurality of queries, each of said plurality of queries having said at least one monitored biometric feature associated therewith;
   performing a first correlation between said monitored biometric feature associated with said current query and said one of said biometric features associated with each of said plurality of biometric data packages, wherein said individual of interest is considered to be identified by said identity data contained in each of said plurality of biometric data packages for which said first correlation achieves a first threshold criteria;
   performing a second correlation between said monitored biometric feature associated with said current query and said monitored biometric feature associated with each of said plurality of queries, wherein an alert message is generated each time said second correlation achieves a second threshold criteria; and
   transmitting, to at least said requesting source, results of (i) said first correlation to include said individual of interest so-identified, and (ii) said second correlation to include each said alert message so-generated.

10. A method according to claim 9 further comprising the step of storing said results of said first correlation and said results of said second correlation.

11. A method according to claim 10 further comprising the step of periodically searching said results of said first correlation to check for multiple identifications of said individual of interest.

12. A method according to claim 9 wherein said data packages are generated at an entry point to a country, and wherein said identity data comprises at least a name of said individual, nationality of said individual, and a local address where said individual is to reside while in said country.

13. A method according to claim 9 wherein said data packages are generated at an entry point to a country, and wherein said biometric features contained in said data packages comprise at least one of
   (i) images of said individual taken at said entry point,
   (ii) voice recordings of said individual recorded at said entry point,
   (iii) weight of said individual recorded at said entry point, (iv) fingerprint data for said individual taken at said entry point,
(v) palm print data for said individual taken at said entry point,
(vi) retinal scan data for said individual taken at said entry point, and
(vii) DNA data for said individual taken at said entry point.

14. A method according to claim 9 further comprising the step of storing said data packages for archive purposes.

15. A method according to claim 14 wherein said step of storing said data packages comprises the steps of:
   parsing each of said data packages into constituent components thereof; and
   distributing said constituent components amongst at least a portion of a plurality of individually-accessible storage facilities geographically-distributed over an area such that spacing between any two of said storage facilities is on the order of miles.

16. A method according to claim 9 wherein said step of transmitting is performed automatically for each said alert message so-generated.

17. A method of assessing suspicious behavior, comprising the steps of:
   generating a data package associated with an individual as said individual passes through an entry point to a country, said data package containing information about said individual to include identity data and biometric features unique to said individual, wherein a resulting plurality of data packages are generated for a corresponding plurality of individuals passing through each said entry point to said country;
   forming a plurality of biometric data packages from each of said data packages with each of said plurality of biometric data packages containing information about one of said biometric features and said identity data associated with said individual;
   categorically storing each of said plurality of biometric data packages based on said one of said biometric features associated therewith;
   accepting a current query from a requesting source, said current query including at least one monitored biometric feature of an individual of interest;
   storing each said current query to thereby generate a plurality of queries, each of said plurality of queries having said at least one monitored biometric feature associated therewith;
   performing a first correlation between said monitored biometric feature associated with said current query and said one of said biometric features associated with each of said plurality of biometric data packages, wherein said individual of interest is considered to be identified by said identity data contained in each of said plurality of biometric data packages for which said first correlation achieves a first threshold criteria;
   performing a second correlation between said monitored biometric feature associated with said current query and said monitored biometric feature associated with each of said plurality of queries, wherein an alert message is generated each time said second correlation achieves a second threshold criteria; and
   transmitting, to at least said requesting source, results of (i) said first correlation to include said individual of interest so-identified, and (ii) said second correlation to include each said alert message so-generated.

18. A method according to claim 17 further comprising the step of storing said results of said first correlation and said results of said second correlation.

19. A method according to claim 17 further comprising the step of periodically searching said results of said first correlation to check for multiple identifications of said individual of interest.

20. A method according to claim 17 wherein said data packages are generated at an entry point to a country, and wherein said identity data comprises at least a name of said individual, nationality of said individual, and a local address where said individual is to reside while in said country.

21. A method according to claim 17 wherein said data packages are generated at an entry point to a country, and wherein said biometric features contained in said data packages comprise at least one of
   (i) images of said individual taken at said entry point,
   (ii) voice recordings of said individual recorded at said entry point,
   (iii) weight of said individual recorded at said entry point,
   (iv) fingerprint data for said individual taken at said entry point,
   (v) palm print data for said individual taken at said entry point,
   (vi) retinal scan data for said individual taken at said entry point, and
   (vii) DNA data for said individual taken at said entry point.

22. A method according to claim 17 further comprising the step of storing said data packages for archive purposes.

23. A method according to claim 22 wherein said step of storing said data packages comprises the steps of:
   parsing each of said data packages into constituent components thereof; and
   distributing said constituent components amongst at least a portion of a plurality of individually-accessible storage facilities geographically-distributed over an area such that spacing between any two of said storage facilities is on the order of miles.

24. A method according to claim 17 wherein said step of transmitting is performed automatically for each said alert message so-generated.

* * * * *